Figure 1:
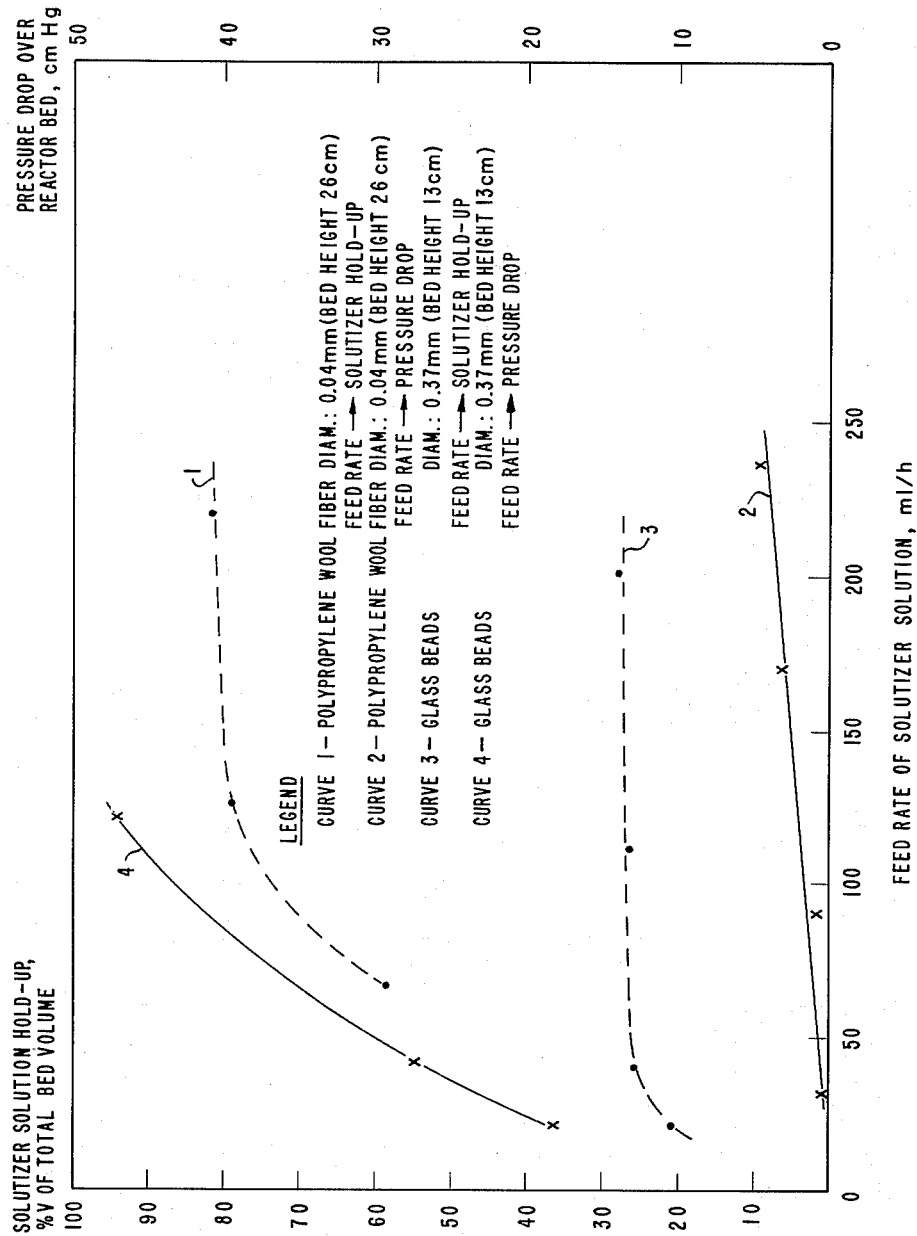

Sept. 21, 1965  P. A. MES  3,207,691
CONTACTING PROCESS USING A PREFERENTIALLY WETTED FIBROUS BED
Filed Oct. 15, 1962  2 Sheets-Sheet 1

INVENTOR:
PIETER A. MES
BY: Jack L. Folz
HIS ATTORNEY

INVENTOR:
PIETER A. MES
BY: *Jack L. Foltz*
HIS ATTORNEY 3,207,691
CONTACTING PROCESS USING A PREFERENTIALLY WETTED FIBROUS BED
Pieter A. Mes, Amsterdam, Netherlands, assignor to Shell Oil Company, New York, N.Y., a corporation of Delaware
Filed Oct. 15, 1962, Ser. No. 230,385
Claims priority, application Great Britain, Oct. 20, 1961, 37,748/61
6 Claims. (Cl. 208—288)

The invention relates to a process for the continuous treatment of a first liquid with a second liquid, which is immiscible therewith.

It has been proposed in U.S. Patent No. 3,014,861 to treat a first liquid with a second liquid which is immiscible therewith, both liquids passing in parallel flow through a contact bed consisting of solid, inert material which is preferentially wetted by the treating liquid; both liquids leaving the contact bed as continuous phases.

According to the patent the treating liquid passes relatively slowly through the contact bed and it moves as a thin film over the contact material preferentially wetted by the treating liquid. The liquid to be treated, on the contrary, not only takes up a much greater volume in the contact bed than the treating liquid but also streams many times faster through the bed than the treating liquid.

In contrast with other processes where two immiscible liquids are brought into contact in a contact bed, the two liquids in the process according to the U.S. Patent No. 3,014,861 leave the contact bed as continuous phases. This is an important advantage, because separation problems, which often occur as a result of the dispersion of one liquid in the other, are then absent or very simple. A disadvantage of the process according to the above-mentioned patent specification is, however, that—as a result of the fact that the treating liquid flows over the contact particles as a thin film—the hold-up of treating liquid in the contact bed is relatively small. Consequently the practical applications of this process will in general be limited to systems with which only small quantities of components have to be exchanged and/or with which a rapid mass transfer from one phase to the other occurs. In those cases where chemical reactions are also involved the reaction rate should be high as well.

There is a great number of processes, however, where the reaction rates are relatively low or where the treating liquid has to be brought into contact with a liquid to be treated and a relaitvely large quantity of components has to be exchanged and/or where—in spite of a large contact area—only a slow transfer of components from one phase to the other takes place. In those cases it is necessary to pass the liquid to be treated through the contact bed at a low space velocity or to employ several contact beds placed in series.

The present invention gives a solution to the problem of bringing two immiscible liquids into contact in a contact bed which has both the advantage of the two liquids leaving the contact bed as continuous phases and the advantage of the presence of a large hold-up of treating liquid in the contact bed.

It has been found that both advantages can be realized if use is made of a contact bed consisting of fibrous material which—in contrast with the process according to U.S. Patent No. 3,014,861—is preferentially wetted by the liquid to be treated.

Thus, according to the invention a process for the continuous treatment of a first liquid with a second liquid which is immiscible therewith comprises passing the liquids in parallel flow through a contact bed consisting wholly or partly of solid, inert, fibrous material which is preferentially wetted by the liquid to be treated (the first liquid), the ratio by volume of the treating liquid (the second liquid) to the liquid to be treated supplied to the contact bed being less than 1 and the direction of flow being governed by the relative specific gravities of the two liquids so that the two liquids flow downward through the contact bed when the specific gravity of the treating liquid is higher and flow upward when the specific gravity of the treating liquid is lower than that of the liquid to be treated, and removing both liquids from the contact bed as continuous phases.

The process according to the invention may be used if components which are present in the one liquid have to be extracted therefrom by the other liquid. Thus, components may pass from the liquid undergoing treatment to the treating liquid. Such an extraction may be followed by a chemical reaction so that the process according to the invention is also suitable for use in carrying out reactions in a heterogeneous liquid medium. The invention may also be used e.g. in polymerizations or condensations of the liquid to be treated or of components present therein in which the treating liquid acts as a catalyst.

In the process according to the invention the internal ratio by volume of the treating liquid to the liquid undergoing treatment may be greater than, equal to or less than 1. The term "internal ratio" indicates the ratio of the amounts of the two liquids that in the steady-state are present in the contact bed. Preferably this ratio is between 10 and 1. In the most preferred embodiment the internal ratio is between 9 and 5.

As mentioned, if the specific gravity of the treating liquid is higher than that of the liquids undergoing treatment the two liquids are passsed downward through the contact bed. Should the two liquids having this relationship between the specific gravities be passed upward through the contact bed, the treating liquid, which has a higher specific gravity than the liquid to be treated, tends to accumulate in the lower part of the contact bed and this considerably promotes the tendency towards the formation of dispersions.

If the specific gravity of the treating liquid is lower than that of the liquid undergoing treatment the two liquids are passed upward through the contact bed. If in this case the two liquids be passed downward through the contact bed, the treating liquid, which has a lower specific gravity than the liquid to be treated, tends to accumulate in the upper part of the contact bed. In this case again a dispersion is very easily formed.

In the process according to the present invention the two liquids leave the contact bed as continuous phases. For this purpose it is essential that the two liquids flow through the contact bed as substantially continuous phases. This is realized by the liquid to be treated flowing in the form of a coherent layer (film) over the surface of the fibrous material which is preferentially wetted by this liquid.

As to the treating liquid one would expect—in view of the large hold-up of treating liquid in the contact bed—that this liquid is enclosed in the form of droplets within the small spaces created by the fine fibers, these droplets remaining more or less confined within these spaces, because the liquid cannot flow down along the fibers. Surprisingly, however, it appears that nevertheless a continuous flow of the treating liquid through the contact bed is possible without a dispersion being formed; obviously this flow takes place by the mutual contacts existing between the various "droplets" confined within the fibers.

As a consequence of the two liquids being present as two continuous phases in the contact bed, they are still present as continuous phases at the moment that they leave the contact bed. It is only at that moment that distinct droplets will be formed (usually of the treating liquid in the liquid to be treated) and substantially all droplets thus formed from the continuous phases present at the exit of the contact bed have such large diameters that their velocity of fall is distinctly higher than the velocity of the liquid mixture immediately after leaving the contact bed. This difference in velocities allows a very rapid and substantially complete separation of the two liquids under the mere influence of gravitational forces without the use of expensive separator devices, resulting in two liquids that on visual inspection are entirely clear and free from haze and turbidity.

In the process according to the present invention it is an essential feature that the contact material be preferentially wetted by the liquid to be treated.

The selection of the material for the contact bed depends on the nature of the two liquids passed through the contactor. Since these liquids are immiscible, one is more polar than the other. If the liquid to be treated is more polar than the treating liquid a fibrous material having a hydrophilic surface is used in order to ensure preferential wetting. If, on the other hand, the liquid to be treated is less polar than the treating liquid, a contact material having a hydrophobic surface is used to ensure preferential wetting by the liquid to be treated.

As fibrous contact materials all kinds of natural and synthetic fibers and filaments may be used. Examples of fibrous materials with a hydrophobic surface are filaments of polyethylene, polypropylene, polystyrene and polytetrafluorethylene (Teflon). A hydrophilic surface is found with fibers and filaments of, e.g., glass, metals and blast-furnace slags. Other well known contact material such as those disclosed in U.S. Patent No. 3,014,861 may be also utilized. Since only the surface is of interest in the present connection, it is of course possible to use fibrous material, e.g., coated fibrous material, consisting of a hydrophilic core and a hydrophobic surface layer or of a hydrophobic core and a hydrophilic surface layer, and the like.

The fibrous material should not react to any substantial extent with the liquids to be passed therethrough, with the components present therein or with any reaction products formed by contact of the two liquids. The material may, however, show a catalytic effect on one or more of the reactions that may take place in the liquid phases.

For a proper course of the present process it is essential that the average diameter of the fibers in the contact bed is 0.3 mm. or less. Preferably an average diameter of the fibers in the range of from 0.1 to 0.01 mm. is chosen. The diameter of the fibers has a great influence on the hold-up of the treating liquid. The ratio of average length to average diameter of the fibers should be at least about 10 and preferably at least about 100.

Another important advantage of the present fibrous material is that contact beds consisting of this material have a very large free space—namely as a rule 80% and upwards. Owing also to this circumstance the pressure drop is very low in comparison with contact beds consisting of granular material. In addition it surprisingly appears that the treating liquid can be passed through the fibrous contact bed at very high space velocities without dispersions being formed.

As stated above, the requirement that the two liquids leave the contact bed as continuous phases, can only be met if they are present as continuous phases in the contact bed, and consequently the formation of dispersions of the one liquid in the other in the contact bed should be avoided.

Although in theory many variables might influence the formation of a dispersion, it has been found that only a limited number of variables are of practical importance in the present connection, the influence of the others being negligible.

The variables of any importance in this connection are the viscosities of the two liquids, the interfacial tension between the two liquids, the linear velocity of the liquids to be treated and the volumetric ratio of the two streams fed to the contact bed.

Generally speaking, it may be stated that an increase of the linear velocity of the liquid to be treated and/or of the viscosity of the liquid to be treated will increase the tendency to create a dispersion, whereas an increase of the interfacial tension between the two liquids and/or of the viscosity of the treating liquid will decrease this tendency.

When the initial operating variables are wrongly selected so as to cause dispersion, it is possible to switch over to dispersion-free operation by taking one or more of the following measures:

(a) Decreasing the liner velocity of the treating liquid,
(b) Increasing the viscosity of the treating liquid;
(c) Increasing the interfacial tension between the two liquids (e.g., by ensuring the absence of surface-active agents);
(d) Decreasing the viscosity of the liquid to be treated (e.g., by dilution);
(e) Decreasing the feed rate of the liquid to be treated keeping the feed rate of the treating liquid constant.

As to the superficial velocity of the treating liquid (i.e., the hypothetical linear velocity as calculated from the throughput per unit of time and from the total cross-section of the contact-bed) it may be stated that this will usually (but not necessarily always) be below 5 cm./sec., even if the limiting value at which dispersion occurs would be higher. If this limiting value should be below 5 cm./sec. for a particular system under particular conditions the superficial linear velocity should of course be lower than said limiting value.

Further it may be stated that the external volumetric ratio of the treating liquid to the liquid to be treated, as supplied to the contact bed, which ratio is always less than 1 in the process according to the present invention, will in practice usually be less than 0.6 and in many cases even considerably lower. This shows that—although there may be a high hold-up of treating liquid in the contact bed—with the use of the process according to the present invention a large quantity of the liquid to be treated may be effectively contacted with a small quantity of treating liquid.

It is advisable that the entire available surface of the fibrous material in the contact be wetted with the liquid to be treated. To this end it is best to wet the contact bed in advance with the liquid to be treated and to spread the latter as uniformly as possible over the entire surface of the contact material during operation, since if only part of this surface is wetted, the contact surface of the two liquids is smaller than if the entire surface of the fibrous contact bed were wetted by the liquid to be treated.

It is further observed that as with other fixed bed processes it is desirable to have a fairly uniform distribution of the two streams over the cross-section of the contact bed, and this may be realized in a conventional way, e.g., by providing special distribution means and/or simply by increasing the height of the contact bed, the additional contact material serving to distribute the feed streams evenly over the cross-section of the remaining contact bed. As a consequence of the use of distributing means, there may occur a certain extraction, conversion or the like before the liquids enter the contact bed. However, in the present process there should occur at least a substantial degree of extraction, conversion, or the like in the contact bed proper.

The contact bed may consist of fibrous material of approximately equal diameter or of fibrous material of different diameters. It may, however, also consist of layers each of which is formed by fibrous material of approximately the same diameter, but in which the diameters differ from layer to layer. Other arrangements are possible.

Although as contact material loose, fibrous material, such as polypropylene wool, can very well be used, it is in many cases advantageous to apply the fibers in the form of a fabric, for instance as felt. The filling of, for instance, a cylindrical column with loose fibrous material to form a homogeneous contact bed requires a certain skill. A homogeneous filling is desirable to be certain of a uniform flow of the liquids over the entire cross section of the column. It is further of importance that the fibers fit snugly against the column wall, to prevent the liquid from running down the wall. With use of fibrous material in the form of fabrics, which are preferably applied in the form of thick mats, the homogeneous packing of the column is simple, because the required bed height can be obtained by merely stacking fibrous mats cut to the shape of the column cross section. The mats can be cut in such a way as to ensure a good seal against the column wall.

In case the liquids to be contacted should contain solid contaminants it is advisable to filter them in order to prevent clogging of the fibrous contact bed.

The contact bed will as a rule be supported on suitable supporting means, such as a perforated plate or a wide-mesh screen, and may also be covered by suitable covering means. In the present invention the term "contact bed" includes both the contact material and any supporting and/or covering means.

As was already observed above, the liquid to be treated and the treating liquid flow as continuous phases through the contact bed. The fact that no—or substantially no—dispersion is formed is of great practical importance, because it makes a simplified procedure possible, for example, in the oil industry in the refining of kerosene, jet fuels and similar hydrocarbon oil fractions with sulfuric acid.

In the conventional procedure, after the treatment of the kerosene, etc., with sulfuric acid, the following operations are carried out in succession: a caustic treatment for the neutralization of acidic components, a water wash for the removal of entrained caustic and a percolation through a salt filter for the removal of water droplets. In some cases the salt filter is followed by one or more other filters to remove the last traces of a haze. Both the caustic treatment and the water wash take place in a mixer, followed by a settler and a coalescer. It is thus seen that for an essentially simple treatment a disproportionately large amount of equipment is required. This is necessary because, during the treatmewnt with sulfuric acid, sulfonic acids are formed. These sulfonic acids, when mixed with a caustic solution, are converted into sulfonates, which, owing to their surface-active properties, have an emulsifying effect. As a result, during contact with the caustic solution a stable haze is formed in the kerosene, which is very difficult to remove.

Since in the process according to the invention an intensive contact between the liquid to be treated and the treating liquid is possible without dispersions being formed, neutralization of the acid treated kerosene can be carried out in a very simple way, namely by passing it, according to the invention, together with a caustic solution through a contact bed consisting of fibrous material having a hydrophobic surface. As appears from Example IV, the kerosene flowing from the contact bed is neutral and needs no after-treatment.

With regard to the acid treatment itself it may be added that the conventional process, which aims at the removal of mercaptans and sometimes also at some degree of desulfurization, consists in first contacting the kerosene with sulfuric acid in a mixer for some time, then separating as much acid as possible in a settler and subsequently removing the finely divided acid drops still left in the kerosene in a coalescer.

The acid treatment may be successfully carried out by passing the kerosene, etc., according to the invention, together with a sulfuric acid phase consisting of a small amount of concentrated acid and a larger amount of recycled semi-spent acid, through a contact bed consisting of fibrous material having a hydrophobic surface.

The time during which the kerosene is in contact with sulfuric acid is considerably shorter in the contact bed than in the conventional mixer. An explanation of the favorable result may be found in the combination of a large hold-up of treating liquid (sulfuric acid) and a large contact area between the two phases in the contact bed.

The invention will further be illustrated by the following examples.

Example I

It is known to treat petroleum fractions with a so-called solutizer solution for removal of mercaptans. The present example gives the results of a number of experiments in which kerosene and a solutizer solution, consisting of equal parts by weight of potassium hydroxide, triethyleneglycol and water, were passed in parallel flow downward through (1) a contact bed consisting of polypropylene wool as a hydrophobic fibrous material being preferentially wetted by the liquid to be treated (kerosene) and (2) a contact bed consisting of glass beads being preferentially wetted by the treating liquid (solutizer solution). Both contact beds were compared as to solutizer hold-up and pressure drop over the bed under identical operating conditions. The feed rate of the kerosene was kept constant and the solutizer dosage was varied. Details of the operation conditions are given in the table below.

| Dimensions of the cylindrical contact bed: | | |
|---|---|---|
| Diameter, mm | 13.5 | 13.5. |
| Bed height, mm | 260 | 130. |
| Bed volume, cm.$^3$ | 37.0 | 18.5. |
| Contacting material | Polypropylene wool.[1] | Glass beads. |
| Size of contracting material, mm | | 0.37. |
| Size of fiber diameter, mm | 0.04 | |
| Packing density, g./cm.$^3$ | 0.065 | 1.82. |
| Porosity, percent | 93.5 | 35. |
| Feed rate of liquid to be treated (kerosene), ml./h. | 500 | 500. |
| Superficial velocity of kerosene, mm./sec. | 1 | 1. |
| Feed rate of treating liquid, ml./h. (solutizer solution). | Various | Various. |
| Appearance of phases leaving the reactor bed in all experiments. | Sharp separation. | Emulsion. |

[1] 8 denier.

For convenience of comparison the results of the experiments are graphically represented in FIGURE 1. In this figure along the X-axis the solutizer solution feed rate has been plotted; along the Y-axis the hold-up of solutizer solution in the contact bed and along the Z-axis the pressure drop over the contact bed.

For the contact bed consisting of polypropylene wool curve 1—at the constant kerosene feed rate of 500 ml./h.—gives the solutizer hold-up in percent by volume of the total bed, at varying solutizer solution feed rates in ml./h.; curve 2 gives the pressure drop in cm. mercury occurring at these varying feed rates.

Curves 3 and 4, respectively, give the corresponding results obtained with the contact bed consisting of glass beads. As appears from the curves 1 and 3, the hold-up of solutizer solution in the polypropylene contact bed was far higher than that in the glass-bead contact bed. It should be noted that in runs employing the glass beads the bed height had to be reduced by half (130 mm.), otherwise the glass equipment would have been exposed to excessive pressure. Nevertheless the curves are comparable, as the hold-up is represented in percent by volume of the bed used.

The kerosene throughput was maintained at a constant rate, equal to an LHSV of 13.5 for the polypropylene wool and 27 for the glass beads $$\left( \text{LHSV} = \frac{\text{throughput}}{\text{bed volume}} \right)$$

These values can be taken as an average for different technical processes. The same holds for the varied throughput rates of the solutizer solution. Of particular significance are the differences in pressure drop through the contact bed, as demonstrated by curves 2 and 4 in FIGURE 1. Notwithstanding the fact that in runs with glass beads half the bed height was used, the pressure drop through this bed was a multiple of that observed in a bed of polypropylene wool.

*Example II*

Analogous experiments to the ones described in Example I were employed for the system kerosene-hydrochloric acid to demonstrate the effect of viscosity of the treating liquid. Details concerning the experiments in which 0.1 N hydrochloric acid was chosen as low-viscosity liquid, are given in the table below.

| Dimensions of the cylindrical contact bed: | | |
|---|---|---|
| Diameter, mm | 13.5 | 13.5. |
| Bed height, mm | 260 | 260. |
| Bed volume, cm.$^3$ | 37.0 | 37.0. |
| Contacting material | Polypropylene wool.[1] | Glass beads. |
| Size of contacting material, mm | | 0.37. |
| Size of fiber diameter, mm | 0.04 | |
| Packing density g./cm.$^3$ | 0.065 | 1.82. |
| Porosity, percent | 93.5 | 35. |
| Feed rate of liquid to be treated (kerosene), ml./h. | 500 | 500. |
| Superficial velocity of kerosene, mm./sec. | 1 | 1. |
| Feed rate of treating liquid (0.1 N HCl). | Various | Various. |
| Appearance of phases leaving the reactor bed in all experiments. | Sharp separation. | Emulsion. |

[1] 8 denier.

Figure 2:
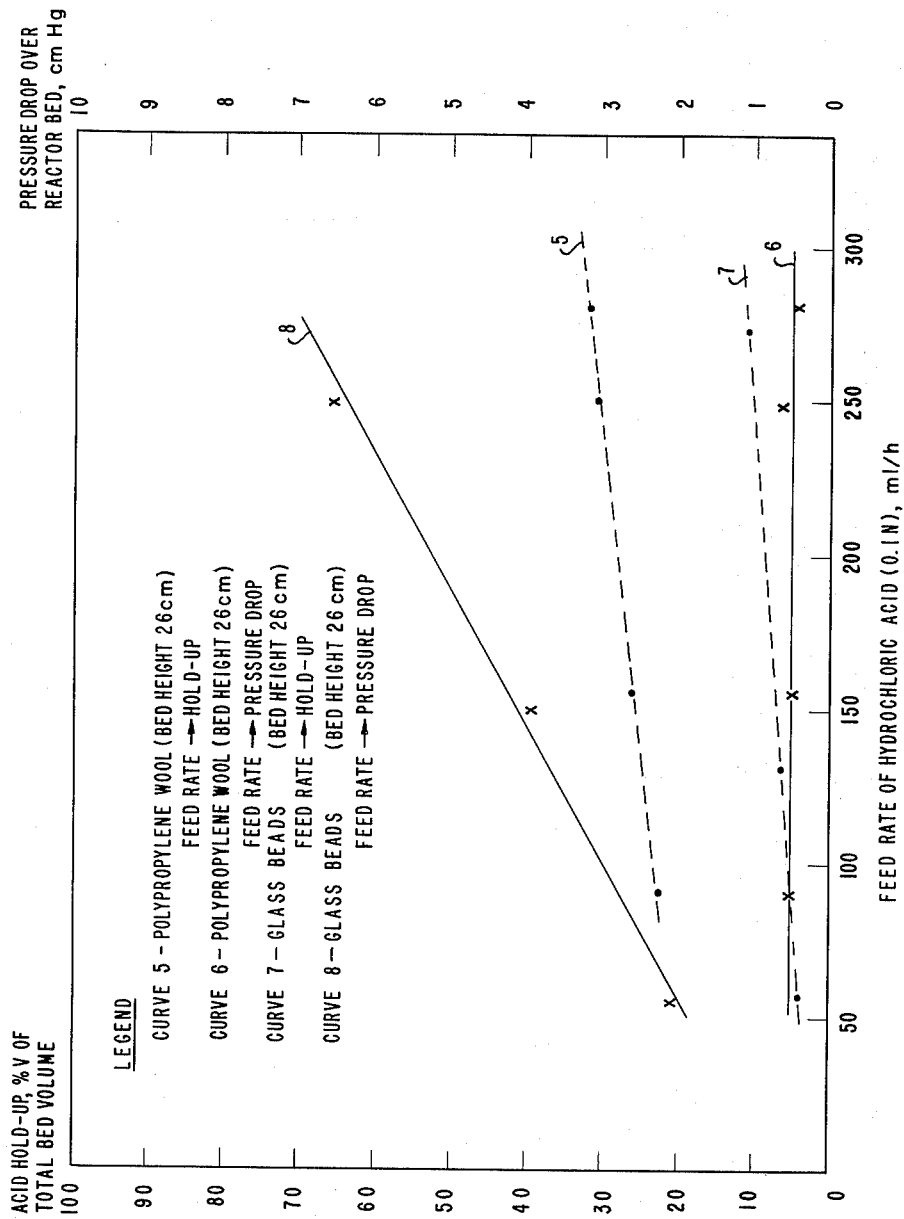

The results are represented in FIGURE 2.

For the contact bed consisting of polypropylene wool curve 5 at a constant feed rate of 500 ml./h.—gives the acid hold-up in percent by volume of the total bed, at varying hydrochloric acid feed rates in ml./h.; curve 6 gives the pressure drop in cm. mercury occurring at these varying feed rates.

Curves 7 and 8, respectively, give the corresponding results obtained with the contact bed consisting of glass beads. The experiments mirror the tendency mentioned in Example I regarding hold-up (curves 5 and 7), and pressure drop (curves 6 and 8) for beds employing polypropylene wool or glass beads. Comparison with FIGURE 1 shows, however, that the differences both in hold-up and in pressure drop are greatly influenced by the viscosity of the treating liquid.

*Example III*

Kerosene was treated with sulfuric acid of 98% concentration by passing the kerosene together with an acid phase consisting of a small amount of fresh acid and a larger amount of circulating semi-spend acid in parallel flow downward through a cylindrical contact bed consisting of polypropylene wool.

Details of the operation are given in the table below.

Dimensions of the cylindrical contact bed:

| | |
|---|---|
| Diameter, mm. | 300 |
| Bed height, mm. | 1350 |
| Bed volume, cm.$^3$ | 95,500 |
| Fiber diameter of polypropylene wool[1], mm. | 0.04 |
| Packing density, g./l. | 94 |
| Porosity, percent | 91 |
| Feed rate kerosene, l./h. | 500 |
| Superficial velocity of kerosene, mm./sec. | 2 |
| Dosage of sulfuric acid, percent vol. | 0.15 |
| Internal ratio by volume kerosene/sulfuric acid | 1:8 |
| Sulfuric acid circulation, percent vol. | 20 |
| Boiling range of kerosene (ASTM), ° C. | 150–250 |
| Mercaptan sulfur content of kerosene, p.p.m. | 129 |
| Doctor test | Negative |
| Mercaptan sulfur content of treated kerosene, p.p.m. | 4 |
| Acid value of treated kerosene, mg. KOH/g. | 0.7 |
| Appearance of treated kerosene | Clear |

[1] 8 denier

The above results show that using the simple technique according to the invention an entrainment free, doctor negative kerosene is obtained without the usual complicated separation equipment and under proportionally comparable kerosene throughput.

*Example IV*

The kerosene treated with the sulfuric acid according to the process described in Example III was neutralized by passing the kerosene and an aqueous sodium hydroxide solution in parallel downward through a cylindrical contact bed of the same dimensions and consisting of the same polypropylene wool as described in Example III.

Details of the operation are given in the table below.

| | |
|---|---|
| Feed rate of kerosene, l./h. | 2150 |
| Dosage of aqueous sodium hydroxide solution, l./h. | 17.5 |
| Concentration of aqueous sodium hydroxide solution, g./l. | 100 |
| Ratio by volume kerosene/NaOH solution | 1:1 |
| NaOH solution circulation, l./h. | 400 |
| Boiling range of kerosene (ASTM), ° C. | 150–250 |
| Acid value of kerosene, mg. KOH/g. | 0.8 |
| Acid value of neutralized kerosene, mg. KOH/g. | <0.001 |
| Sodium content of neutralized kerosene, p.p.m. | 0.14 |
| IP 10 burning test, mg. char/kg. | 11 |
| ASTM D 1600–59: T CFR fuel coker test 300–400° F.: | |
| D.p. filter (300 min.), inch Hg | 0.25 |
| Tube rating (max.) | 0 |
| Tube rating (total) | 0 |
| ASTM D 1094–57 water tolerance test—rating | 1b |

The above results show that the finished kerosene is completely neutral and meets the most critical specifications.

I claim as my invention:

1. A process for the treatment of the first liquid petroleum fraction with a treating liquid which has a higher specific gravity and which is immiscible therewith comprising:
    (a) passing said liquids countercurrently in parallel flow through a contact bed consisting essentially of solid, inert fibrous contact material which is preferentially wetted by said first liquid, said material having a maximum fiber diameter no greater than about 0.3 millimeters, with the ratio by volume of treating liquid to first liquid being less than 1;
    (b) regulating the quantities of the liquid supplied to the contact bed to maintain a preferential wetting of the bed by the first liquid, thereby providing a large contacting surface for the two liquids without the accumulation of excess first liquid in the bed; and
    (c) withdrawing the two liquids from the bed as continuous phases without the dispersion of either liquid in the emerging stream of the other.

2. A process in accordance with claim 1 wherein the fibrous contact material is a member of the group consisting of glass, metals, blast-furnace slags, polyethylene, polypropylene, polystyrene, and polytetrafluoroethylene.

3. A process in accordance with claim 1 wherein the contact material has an average fiber diameter within the range of about 0.01 mm. up to about .1 mm.

4. A process in accordance with claim 1 wherein the contact material has a ratio of average length to average diameter of at least about 10.

5. The process in accordance with claim 1 wherein the fibrous contact material has an average fiber diameter of 0.04 millimeter.

6. A process in accordance with claim 1 wherein said first liquid is kerosene and the treating liquid comprises equal parts by weight of potassium hydroxide, triethylene glycol and water.

References Cited by the Examiner

UNITED STATES PATENTS 3,014,861  12/61  Buningh _____ 208—287

ALPHONSO D. SULLIVAN, *Primary Examiner.*